US009754383B1

(12) United States Patent
Hagendorn et al.

(10) Patent No.: US 9,754,383 B1
(45) Date of Patent: Sep. 5, 2017

(54) AUTOMATED METHODS FOR ASSESSMENT OF CELIAC DISEASE

(71) Applicant: Flagship Biosciences, Inc., Westminster, CO (US)

(72) Inventors: Erik Hagendorn, Boulder, CO (US); Steven Potts, Flagstaff, AZ (US); Nathan T. Martin, Boulder, CO (US)

(73) Assignee: FLAGSHIP BIOSCIENCES, INC., Westminster, CO (US)

( * ) Notice: Subject to any disclaimer, the term of this patent is extended or adjusted under 35 U.S.C. 154(b) by 64 days.

(21) Appl. No.: 14/980,715

(22) Filed: Dec. 28, 2015

Related U.S. Application Data

(60) Provisional application No. 62/095,566, filed on Dec. 22, 2014.

(51) Int. Cl.
*G06K 9/00* (2006.01)
*G06T 7/60* (2017.01)
*G06T 7/00* (2017.01)
*A61B 5/00* (2006.01)

(52) U.S. Cl.
CPC ............ *G06T 7/602* (2013.01); *G06T 7/0083* (2013.01); *G06T 7/0085* (2013.01); *G06T 2207/20144* (2013.01); *G06T 2207/30024* (2013.01); *G06T 2207/30092* (2013.01)

(58) Field of Classification Search
USPC ....... 382/100, 103, 106, 128–134, 162, 168, 382/173, 181, 189, 199, 209, 219, 224, 382/232, 254–255, 274, 276, 286–291, 382/305, 312; 600/306; 426/231; 424/133.1; 435/7.2
See application file for complete search history.

(56) References Cited

U.S. PATENT DOCUMENTS

| | | | |
|---|---|---|---|
| 9,324,145 B1 * | 4/2016 | Cherevatsky | G06T 7/42 |
| 2004/0253649 A1 * | 12/2004 | Smith | G01N 1/30 435/7.2 |
| 2010/0003242 A1 * | 1/2010 | Sabbadini | C07K 16/44 424/133.1 |
| 2011/0301441 A1 * | 12/2011 | Bandic | A61B 5/0059 600/306 |
| 2012/0321759 A1 * | 12/2012 | Marinkovich | A61B 5/0531 426/231 |

* cited by examiner

*Primary Examiner* — Seyed Azarian
(74) *Attorney, Agent, or Firm* — Coastal Patent Law Group, P.C.

(57) ABSTRACT

The invention concerns automated methods for assessing tissue morphometry in digital images of tissue sections derived from small intestine biopsy samples from patients submitted for evaluation of celiac disease. The methods generally involve digital image analysis of tissue section images, and specifically involve post-processing each image to produce a binary mask capturing the tissue area footprint on the glass slide. Virtual stereology probes are placed on each image and assessed to estimate the ratio of the surface area to volume of the tissue specimen. The surface area to volume ratio is used to diagnose celiac disease and make inferences about the severity of celiac disease in those individuals with a positive diagnosis of celiac disease.

18 Claims, 15 Drawing Sheets

Original image | Raw binary mask of tissue | Binary mask after post-processing of tissue image

US 9,754,383 B1

AUTOMATED METHODS FOR ASSESSMENT OF CELIAC DISEASE

CROSS-REFERENCE TO RELATED APPLICATIONS

This application claims benefit of priority with U.S. Provisional Ser. No. 62/095,566, filed Dec. 22, 2014; the contents of which are hereby incorporated by reference.

BACKGROUND

Field of the Invention

This application relates to methods for automated assessment of celiac disease; and more particularly to algorithm processes implemented by a computer to assess gross tissue morphometry for the purpose of diagnosing celiac disease and monitoring treatment efficacy.

Description of the Related Art

Celiac disease is an inflammatory disease that impacts the gastrointestinal (GI) track of patients [Catassi C, Fasano A, Am J Med, 2010; 123(8):691-693]. The inflammatory response is initiated by a reaction to gliadin in gluten, and clinical symptoms can be variable. Celiac disease can present as constipation, depression, fatigue, osteoporosis, acid reflux, infertility, as dermatologic conditions, and other less common symptoms.

Roughly 1% of the United States' population has celiac disease and the prevalence in Western Europe can be as high as 2.4% [Rubio-Tapia A, Ludvigsson J F, Am J Gastroenterol, 2010; 107:1538-1544]. Often the majority of patients do not know that they have celiac disease [Rubio-Tapia A, Ludvigsson J F, Am J Gastroenterol, 2010; 107:1538-1544]. The average time to diagnosis can be years, and patients are typically diagnosed when they meet four of the five following criteria: 1) typical clinical symptoms of celiac disease, 2) positive serologic markers such as serum anti-transglutaminase (TTG) antibodies or anti-gliadin antibodies, 3) small intestinal biopsy showing absent or blunted villi and increased numbers of intraepithelial cells, 4) positive genetic screening for HLA-DQ2 or -DQ8, and 5) improvement of symptoms on a gluten-free diet [Catassi C, Fasano A, Am J Med, 2010; 123(8):691-693].

Histologic scoring of small intestine biopsies remain the 'gold standard' for diagnosing celiac disease in patients suspected to have the disease. The histology scoring paradigm is based on the Marsh-Oberhuber classification which integrates measurements of intraepithelial lymphocytes, crypt hyperplasia, and villous atrophy [Oberhuber G et al., Eur J Gasteroenterol Hepatol, 1999; 11 (10):1185-1194].

Like most histologic scoring paradigms, the Marsh-Oberhuber classification is a semi-quantitative scoring scheme. Specifically, the assessment of villus atrophy in human tissues is a qualitative process that is dependent on the subjective assessment of tissue by an experienced pathologist. Risdon and Keeling have described a semi-quantitative method for assessing tissue sections [Risdon R A and Keeling J W, Gut, 1974; 15:9-18]. However, this method remains a manual assessment of tissue that is both subjective and time consuming.

SUMMARY

Automated algorithm-based solutions for assessing intestinal biopsy tissues from patients suspected to have celiac disease could remove the subjective nature of tissue assessment for the Marsh-Oberhuber scoring scheme, and provide a quantitative assessment of disease severity. Additionally, algorithm-based solutions enable the optional translation of traditional histologic scoring of tissue biopsies from a discrete scale (i.e. 0, 1, 2, 3a, 3b, 3c) to a continuous scale (i.e. 0-5).

Quantitative assessment of tissue biopsies from suspected celiac patients may support diagnostic paradigms for the disease through greater standardization of tissue scoring, increased confidence in histologic score values, and the potential for higher throughput. More importantly, however, quantitative scoring paradigms in celiac disease could be crucial to support the development of novel therapeutic approaches.

Until recently, there has been a lack of pharmaceutical programs to develop therapeutics for celiac disease. The lack of programs was attributed mainly to the perceived low-cost solution of a gluten-free diet to treat the disease. However, compliance with the diet is difficult given the almost ubiquitous presence of gluten in restaurants, food products, and drug prescriptions. In addition, there is a substantial subset of patients who do not respond to a gluten free diet and all patients are at risk for long-term complications, including osteoporosis, small intestinal lymphoma, type 1 diabetes, thyroid and liver disorders, psoriasis, and lupus [Lewis N R, Holmes G K, Expert Rev Gastroenterol Hepatol, 2010; 4(6):767-780].

Recently, several pharmaceutical companies have initiated therapeutic programs aimed at treating celiac disease. The primary endpoint for these trials is likely to be based on assessment of biopsy samples from the patient cohorts [United States Food and Drug Admin, 2014, Presented at development of therapies for celiac disease, 20-21 Mar. 2014]. Therefore, there is an additional need for a quantitative scoring paradigm for biopsy tissues obtained from celiac patients to monitor drug responses.

Herein, we describe two quantitative algorithm-based methods for assessing the tissue architecture of human intestinal biopsy samples taken from patients suspected to have celiac disease. The methods go far beyond the ability of manual observation of tissue samples through a microscope, and result in a quantitative assessment of villus atrophy for the purpose of diagnosing and staging celiac patients and for monitoring therapeutic efficacy in celiac patients.

In accordance with the embodiments described herein, we describe automated methods for assessing tissue morphometry in digital images of tissue sections derived from small intestine biopsy samples from patients submitted for evaluation of celiac disease. The methods generally involve digital image analysis of tissue section images, and specifically involve post-processing each image to produce a binary mask capturing the tissue area footprint on the glass slide. Virtual stereology probes are placed on each image and assessed to estimate the ratio of the surface area to volume of the tissue specimen. The surface area to volume ratio is used to diagnose celiac disease and make inferences about the severity of celiac disease in those individuals with a positive diagnosis of celiac disease. Alternatively, the methods described herein identify the boundaries of each tissue section based on the binary mask, and calculates the ratio of the perimeter to the area of the tissue section. The estimate of perimeter to area is used to diagnose celiac disease and make inferences about disease severity for those individuals diagnosed with celiac disease.

DETAILED DESCRIPTION OF EMBODIMENTS

Figure 1:
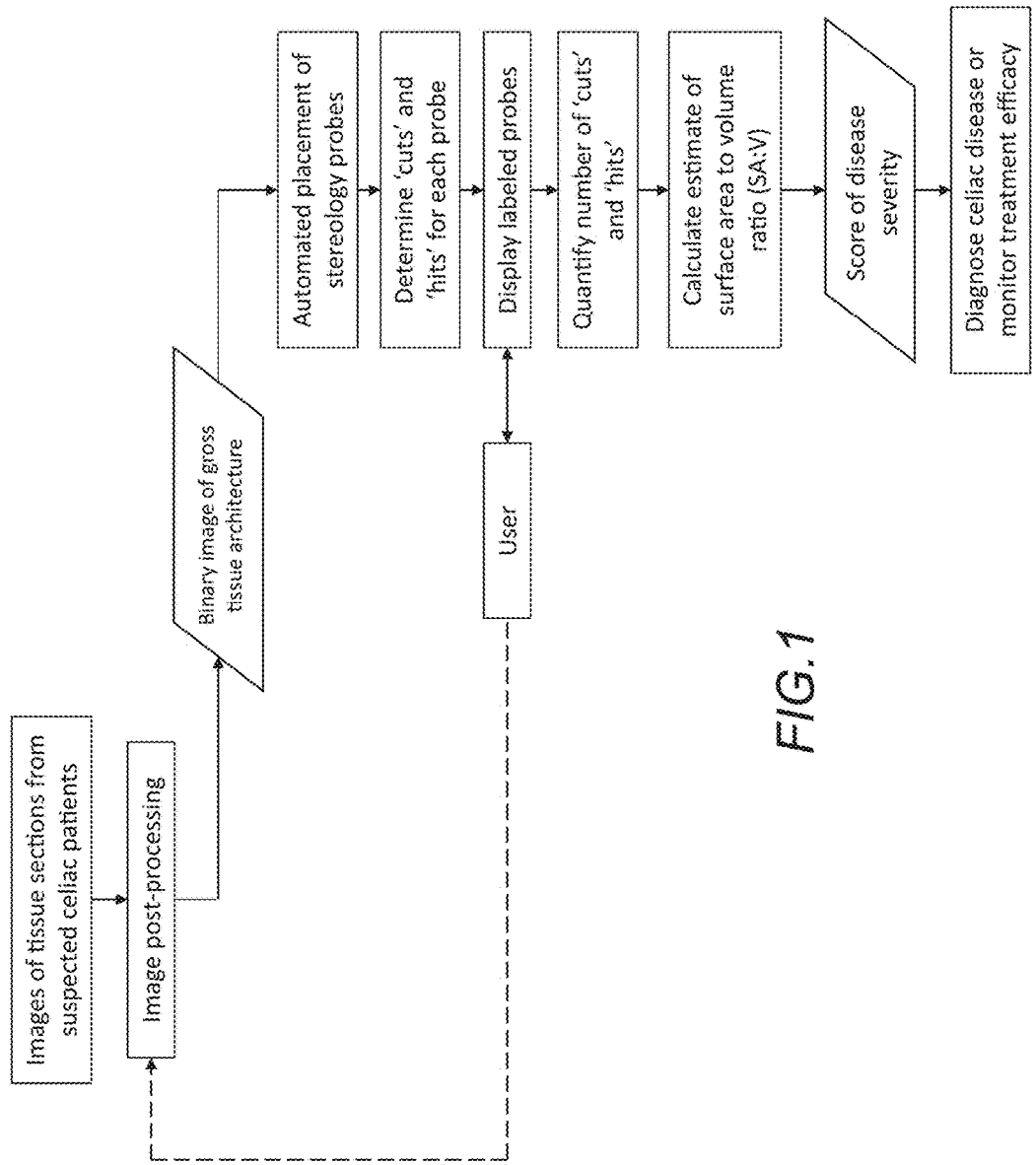
FIG. 1 illustrates the method for using virtual stereology probes, placed on a post-processed image of a tissue section, to estimate the surface area to volume ratio of each image to score the severity of celiac disease in an individual.

In the following description, for purposes of explanation and not limitation, details and descriptions are set forth in order to provide a thorough understanding of the present invention. However, it will be apparent to those skilled in the art that the present invention may be practiced in other embodiments that depart from these details and descriptions without departing from the spirit and scope of the invention.
Automated Stereology Assessment of Tissue Submitted for Celiac Disease Evaluation In an illustrative embodiment, as illustrated in FIG. 1, the method of automated stereology assessment of tissue from individuals submitted for celiac disease evaluation comprises 8 consecutive steps, consisting of: 1) obtaining images of stained tissue sections cut from small intestine biopsy samples, 2) post-processing said images to produce a binary mask of said tissue which captures the tissue area footprint of the tissue on the slide, 3) automated placement of virtual stereology probes on the binary mask image of said tissue section, 4) assessing the hit and cut status for each probe, 5) displaying said assessment of hits and cuts for each probe, 5) quantifying the total number of cuts and positive hits, 6) calculating an estimate of the surface area to volume ratio (SA:V) based on the cut and hit counts, 7) producing a score of celiac disease severity for each tissue section analyzed based on the SA:V value, and 8) diagnosing celiac disease status and disease severity based on said score.

The automated stereology-based method described herein assesses the tissue area footprint on the glass slide. Specifically, the method estimates the gross tissue morphometry (i.e. smoothness of villi) as a surrogate indicator of villus height and presentation. Therefore, each tissue section for evaluation needs to be stained with one or more histologic stains (i.e. hematoxylin and eosin, H&E) that highlight the gross size and shape of the tissue prior to digitalization with a digital slide scanner or microscope coupled with a camera.

Once the tissue section has been stained and processed using accepted histologic practices, the tissue section is scanned using a digital slide scanner or a microscope coupled with a camera to produce a digital image of the tissue section. The digital images of the tissue section(s) are made available for assessment by the automated stereology algorithm process implemented by a computer.

Figure 2:
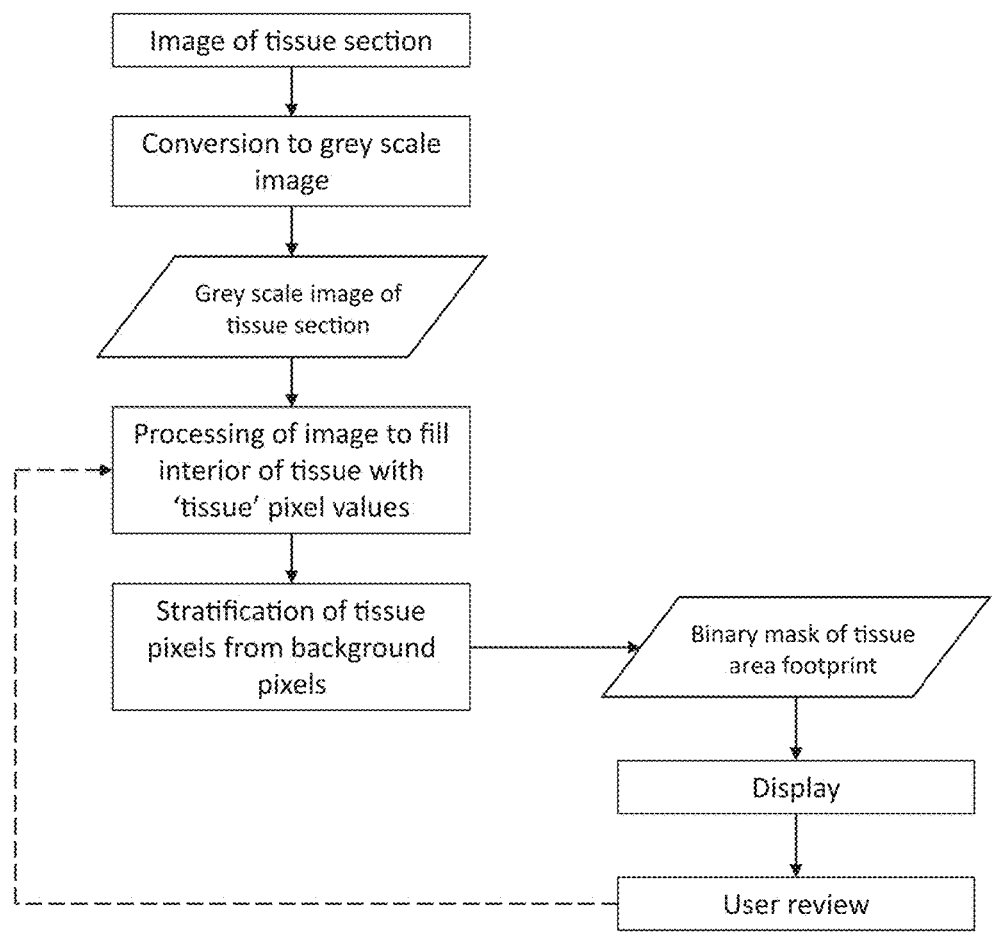
FIG. 2 demonstrates the post-processing steps applied to each image of a tissue section from a suspected celiac patient to generate a binary mask of the tissue section which captures the tissue area footprint of said tissue section.

FIG. 2 summarizes processing steps implemented by the algorithm process. The algorithm process performs a plurality of steps to process the image of each tissue section. Each image is first converted from a color image of the tissue section to a grey scale image. Once converted, the algorithm process implements one or more image post-processing steps (i.e. image blurring, image sharpening, pixel intensity thresholding, etc.) to arrive at a binary mask of the area footprint of the tissue section. The binary mask of the tissue is displayed using a graphical user interface, and the mask is reviewed. Optionally, user assessment of the mask can be fed back into the image post-processing step to refine the binary mask to better represent the tissue area footprint.

Figure 3:
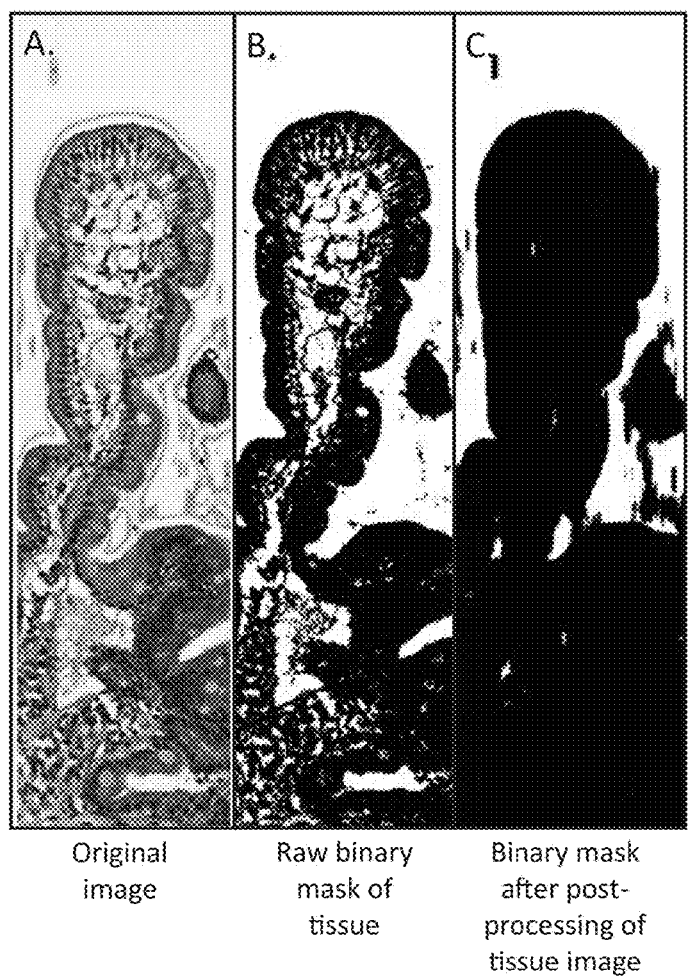
FIG. 3 provides an example of a portion of a small intestine biopsy sample stained by hematoxylin and eosin (A). Panel B shows an example of a binary mask of the original image (A) without additional post-processing steps. Panel C demonstrates the method described herein, whereby a plurality of post-processing steps are applied to an image (A) to arrive at a binary mask capturing the entire area tissue area footprint of the tissue section.

FIG. 3 illustrates the result of the algorithm process to generate a binary mask of the area footprint of a region of a tissue section. The original region of the H&E stained tissue section is displayed in Panel A. For illustration, Panel B displays the result of a simple pixel threshold to separate the tissue area from the slide background. This simple process does not fill in the interior of the tissue area sufficiently, and does not outline the area footprint of the tissue section. Panel C illustrates the result of applying the algorithm process to the tissue section to produce a binary mask which outlines the area footprint of the tissue section. Background pixels are shown as white, while tissue area pixels are black.

Once an adequate binary mask of the tissue section is produce, virtual stereology probes are overlaid on the image. It is important for the downstream analysis by stereology approaches that the binary mask of the tissue section accurately capture and fill in the footprint of the tissue area. Therefore, great care needs to be taken when applying image post-processing steps and evaluating the outcome of the mask.

A plurality of virtual stereology probes are overlaid on the binary mask of the tissue section. The probes are lines with defined coordinate start and end points, and each probe is the same length. Probes are overlaid in a geometry specified by the user (i.e. synchronized, hexagonal, random, etc.).

Once the stereology probes are overlaid on the binary mask of the tissue section area, the hit status of the probe termini and cut status for each probe are determined. Each probe, and assessment of cuts and hits, is displayed on an image of the tissue section, or the binary mask of the tissue section area footprint. The user of the algorithm can review the overlay of the stereology probes and the assessment of cuts and hits. Based on user assessment of probe placement and the cut and hit status of each probe, feedback can be integrated into the probe placement step to refine the analysis of stereology probes.

Assessment of stereology probes entails analysis of the 'hit' status of the probe termini, and the 'cut' status along the length of the probe. A positive hit at a probe terminus indicates that the end of said probe is inside the footprint area of the tissue. A negative hit at a probe terminus indicates that the end of said probe is outside the footprint area of the tissue. A cut occurs along the length of a probe when said probe transitions from inside the footprint area of the tissue to outside the footprint area of the tissue.

Cuts on probes and positive hits are counted as +1, and individually summed for all probes (i.e. the algorithm counts to total number of cuts and total number of positive hits). Negative hits score as +0 and do not add to the total number of positive hits.

The sum of hits and cuts are used to calculate an estimate of the surface area to volume ratio (SA:V) of the tissue sample. The total number of cuts are divided by the product of the probe length and the total number of positive hits.

Figure 4:
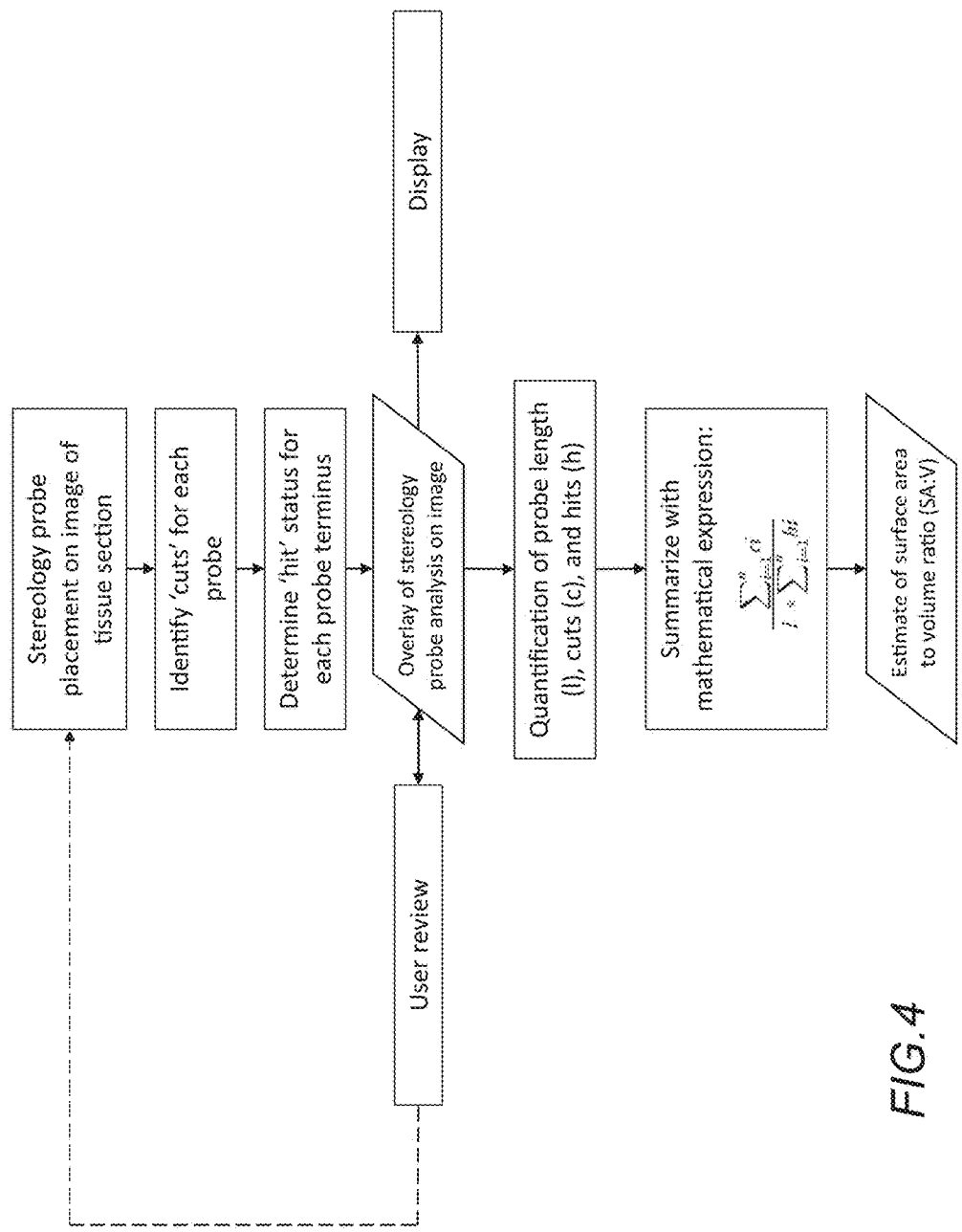
FIG. 4 illustrates the method by which stereology probes are placed on an image of a tissue section and assessed to derive an estimate of the surface area to volume ratio.

FIG. 4 provides an overview of the steps implemented by the algorithm process to estimate the surface area to volume ratio (SA:V) for the tissue sample using the automated stereology method described herein.

Figure 5:
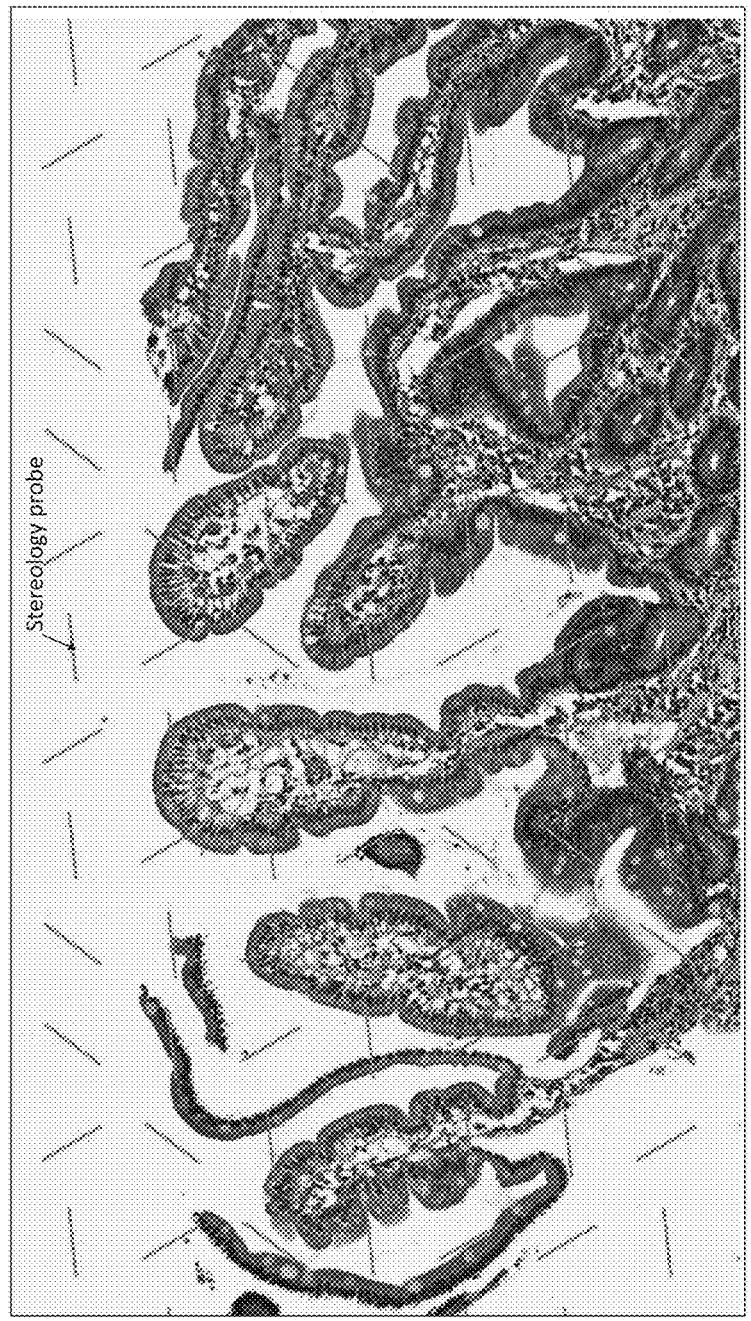
FIG. 5 illustrates the placement of stereology probes on an image of a small intestine biopsy derived tissue section in a standard hexagonal pattern orientation.

In an illustrative example, FIG. 5 demonstrates an example of a hexagonal orientation of stereology probes overlaid on the original image of a region of a tissue section. The probes are displayed as green lines.

Figure 6:
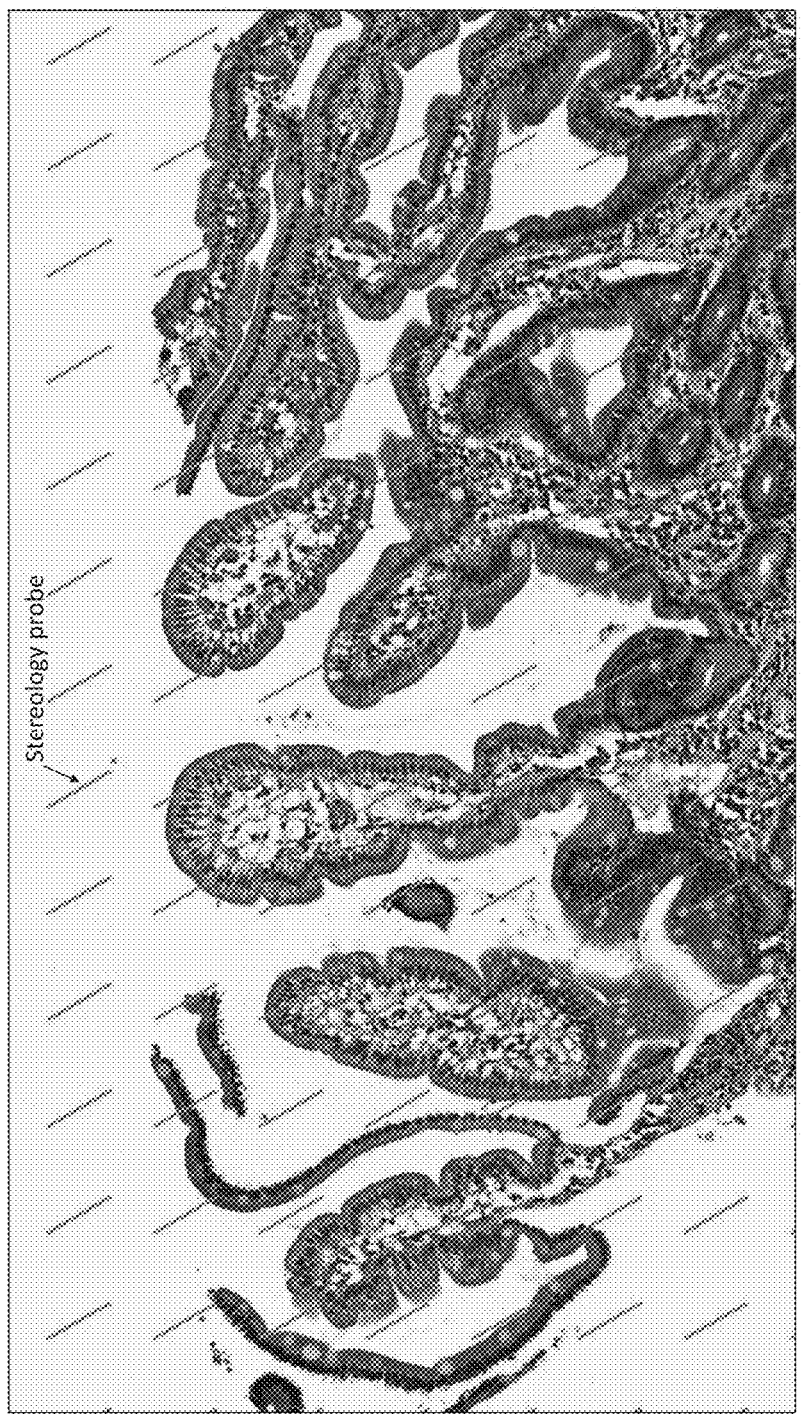
FIG. 6 illustrates the placement of stereology probes on an image of a small intestine biopsy derived tissue section in a synchronized pattern orientation.

In an illustrative example, FIG. 6 demonstrates an example of a synchronized orientation of stereology probes overlaid on the original image of a region of a tissue section. The probes are displayed as green lines.

Both FIGS. 5 and 6 illustrate an embodiment of this invention whereby the stereology probes are displayed on the original image of the tissue section. In another embodiment of this invention, the stereology probes can be overlaid on the binary mask image of the tissue section area footprint.

Figure 7:
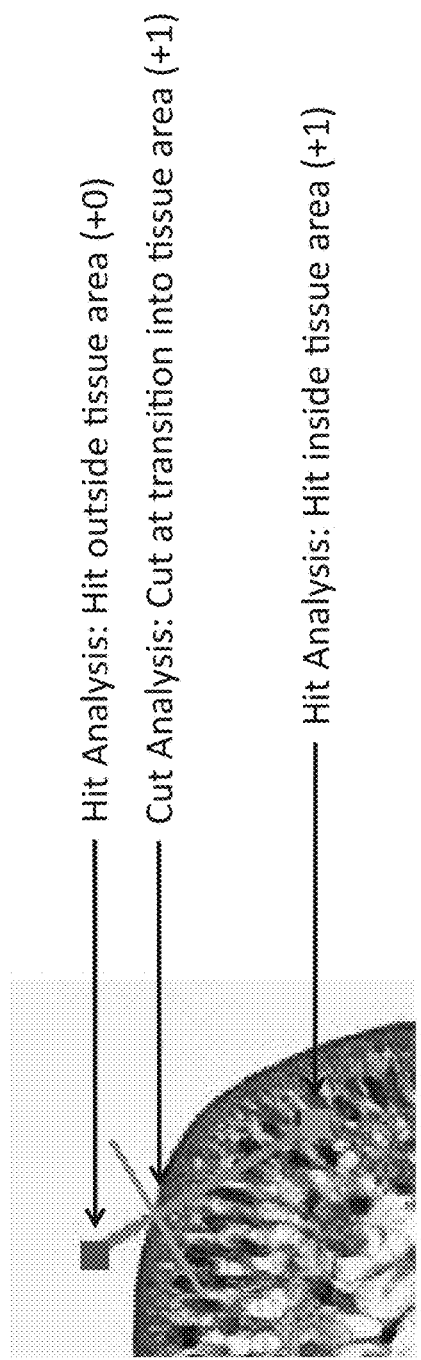
FIG. 7 demonstrates the assessment of a tissue boundary using a stereology probe. Show is an example analysis of tissue 'hits' at the termini of the probe, and 'cut' points at the transition from tissue to image background.

FIG. 7 illustrates a sample analysis of a stereology probe at the edge of a region of tissue. The image of the region of H&E stained tissue is displayed under the probe (green line). The terminus of the probe which is inside the area of the tissue is scored as a positive hit (green square, +1), while the terminus of the probe which is outside of the area of the tissue is scored as a negative hit (red square, +0). The point at which the probe transitions from inside to outside the tissue area is identified as a cut (green line transecting the probe, +1).

Figure 8:
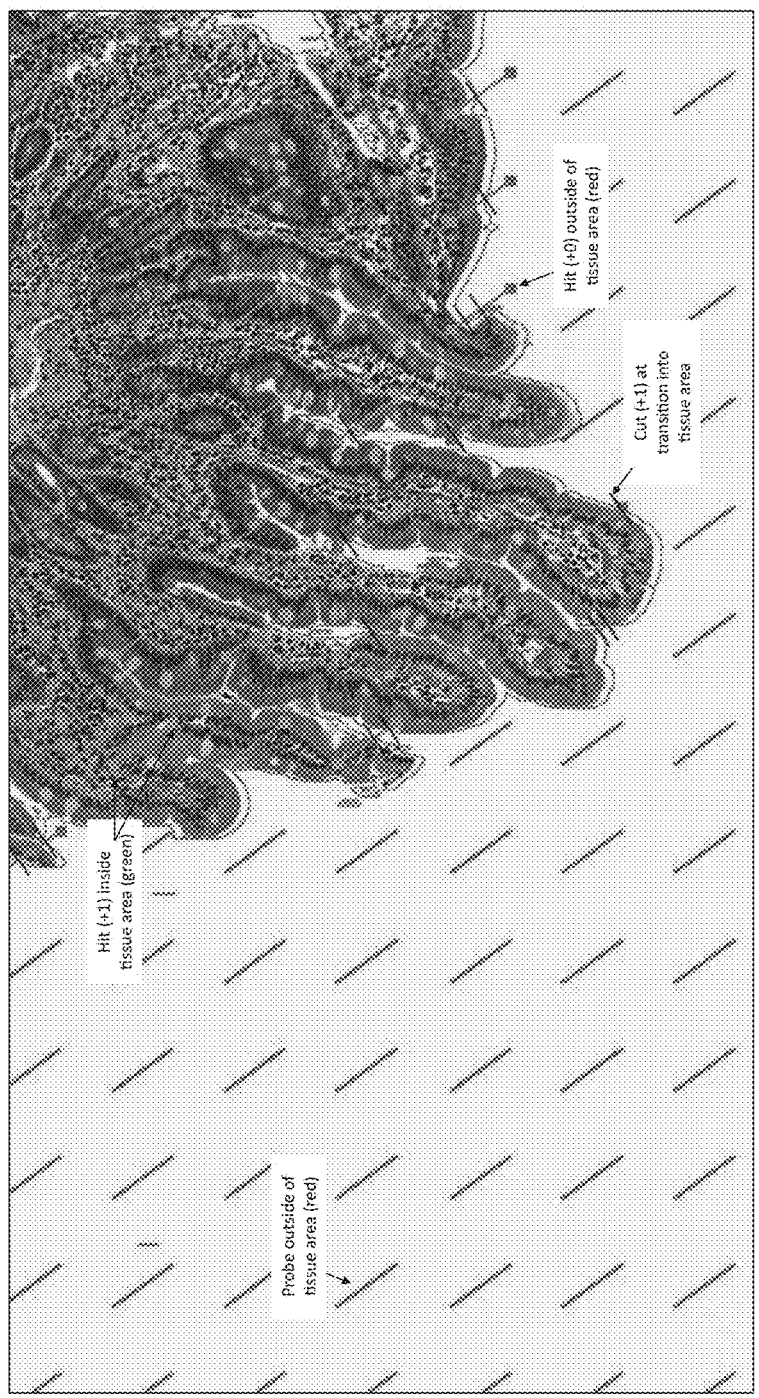
FIG. 8 shows an example analysis of stereology probes to assess the gross tissue architecture of a small intestine biopsy derived tissue section stained with hematoxylin and eosin from an individual suspected to have celiac disease.

In an illustrative example, FIG. 8 shows the overlay of the stereology probe assessment on a region of an H&E stained tissue section. Probes have been aligned in a synchronized manner, and probes which are completely outside of the footprint of the tissue area are excluded from analysis (red probes). Positive hits (green squares, +1), negative hits (red squares, +0), and cuts (black transecting line, +1) are identified and displayed for each probe which contacts the tissue area (green probes).

A summary value of the surface area to volume ratio (SA:V) is used to score (i.e. the SA:V value, linear transformation of SA:V value, non-linear transformation of the SA:V value, etc.) celiac disease severity for each patient sample under evaluation. A stratification scheme is applied to the disease severity scores, and used to bin the individuals submitted for evaluation.

The stratification scheme entails applying selection criteria (i.e. thresholds, logical operators, etc.) to the disease severity score based on the SA:V value. The stratification scheme bins individuals submitted for evaluation into two diagnostic bins for celiac disease (i.e. positive diagnosis of celiac disease and negative diagnosis of celiac disease bins) and further sub-classifies the positive diagnosis bin into two or more sub-bins corresponding to disease severity (i.e. Marsh scores of 1, 3A, 3B, 3C).

Figure 9:
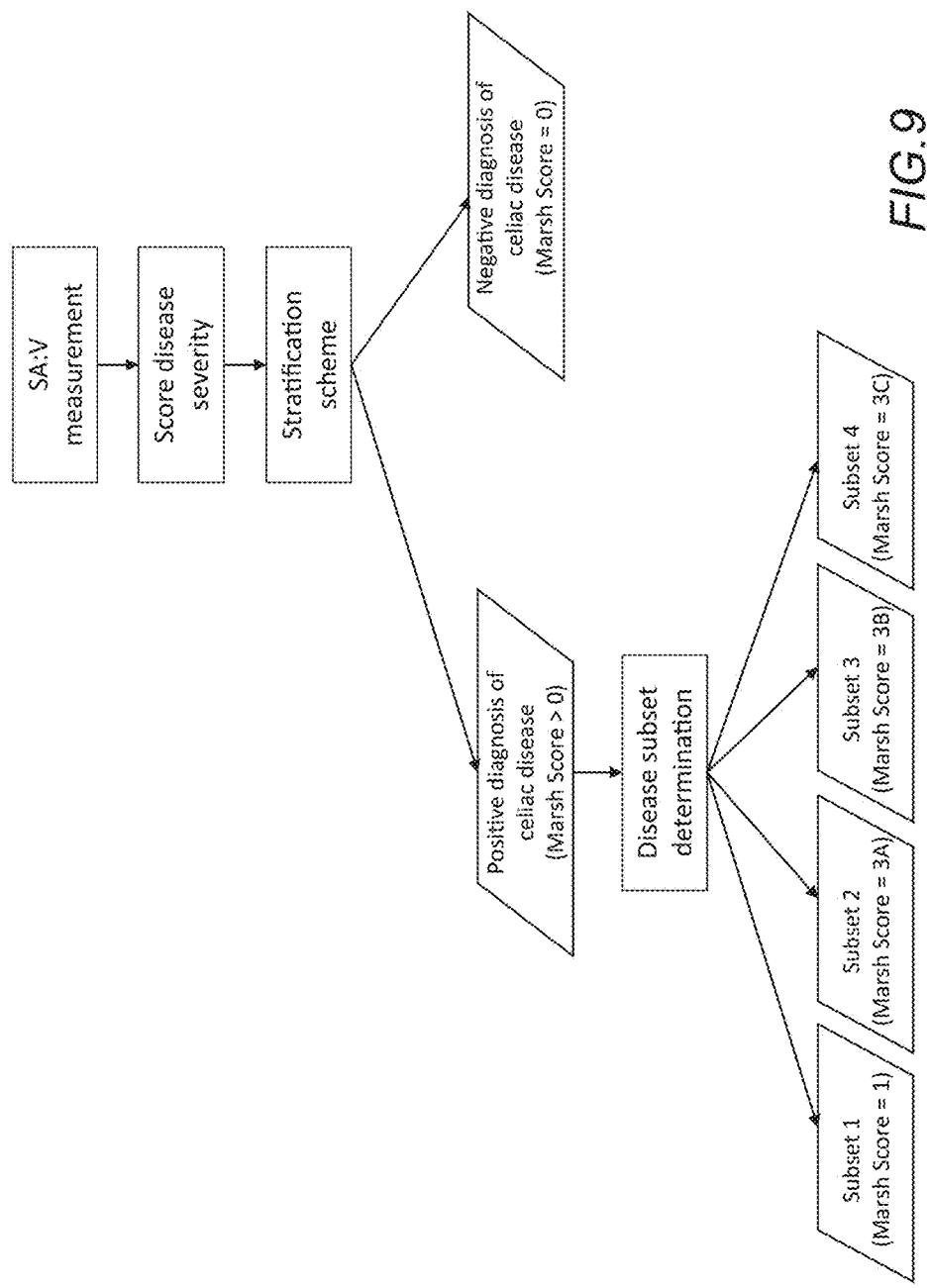
FIG. 9 demonstrates the method by which the SA:V measurement is used to score disease severity, which leads to determination of a positive or negative diagnosis of celiac disease and sub-classification of those individuals with a positive diagnosis of celiac disease based on disease severity.

In an illustrative embodiment, FIG. 9 demonstrates the process by which patients are stratified using the SA:V value estimated by the automated stereology algorithm process. The stratification scheme, in this example, was devised to predict the 'gold standard' Marsh score for diagnosing celiac disease and for sub-classifying celiac disease patients based on the severity of the disease.

Figure 10:
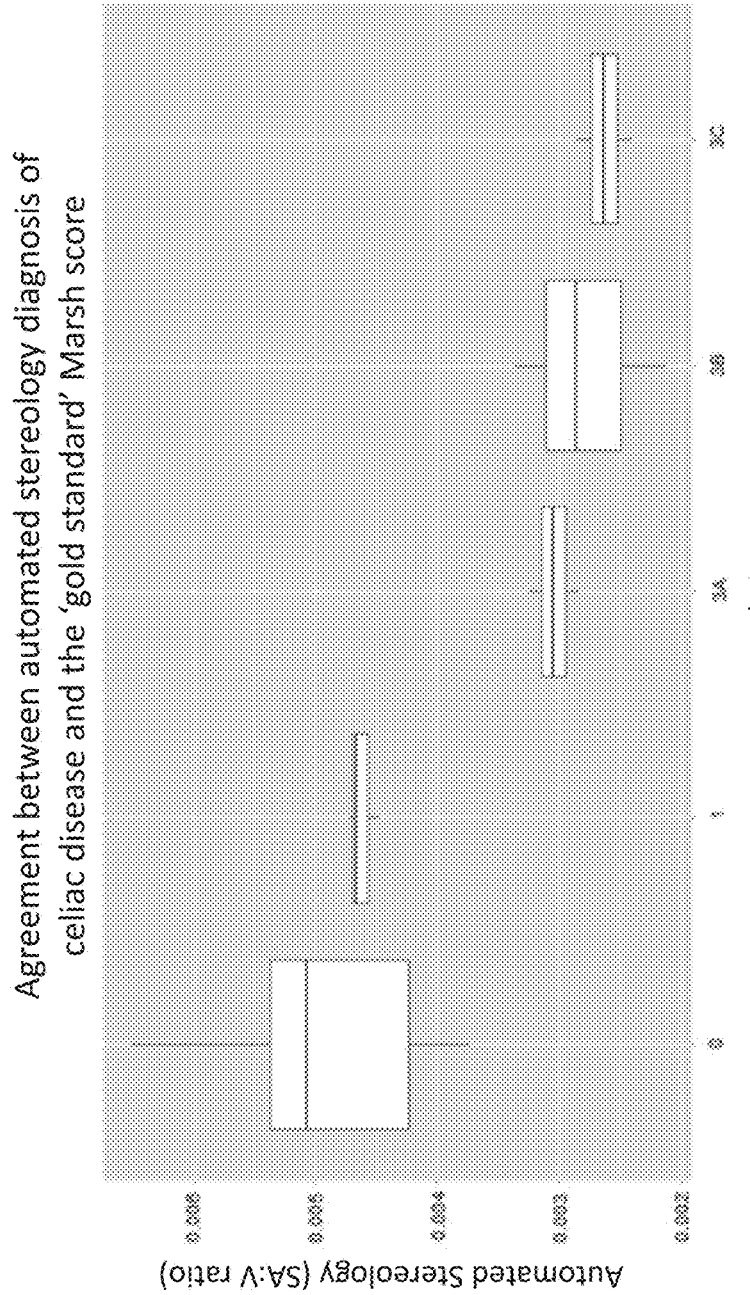
FIG. 10 shows the agreement between the automated stereology method described herein and the 'gold standard' Marsh Score, and highlights the ability of the automated stereology method to diagnose and sub-classify celiac disease.

FIG. 10 demonstrates the agreement between the automated stereology algorithm process prediction of celiac disease and disease severity and the 'gold standard' Marsh Score for a sample cohort of suspected celiac disease patients submitted for evaluation.

In another embodiment of this invention, the automated stereology assessment of gross tissue architecture method described herein can be used to assess the severity of celiac disease in celiac disease patients with the purpose of monitoring disease progression and treatment efficacy. In this embodiment, tissue sections from patients can be evaluated at various time points to monitor disease progression, or can be evaluated during one or more of: prior to, during, and after therapeutic intervention to evaluate therapeutic efficacy.

Figure 11:
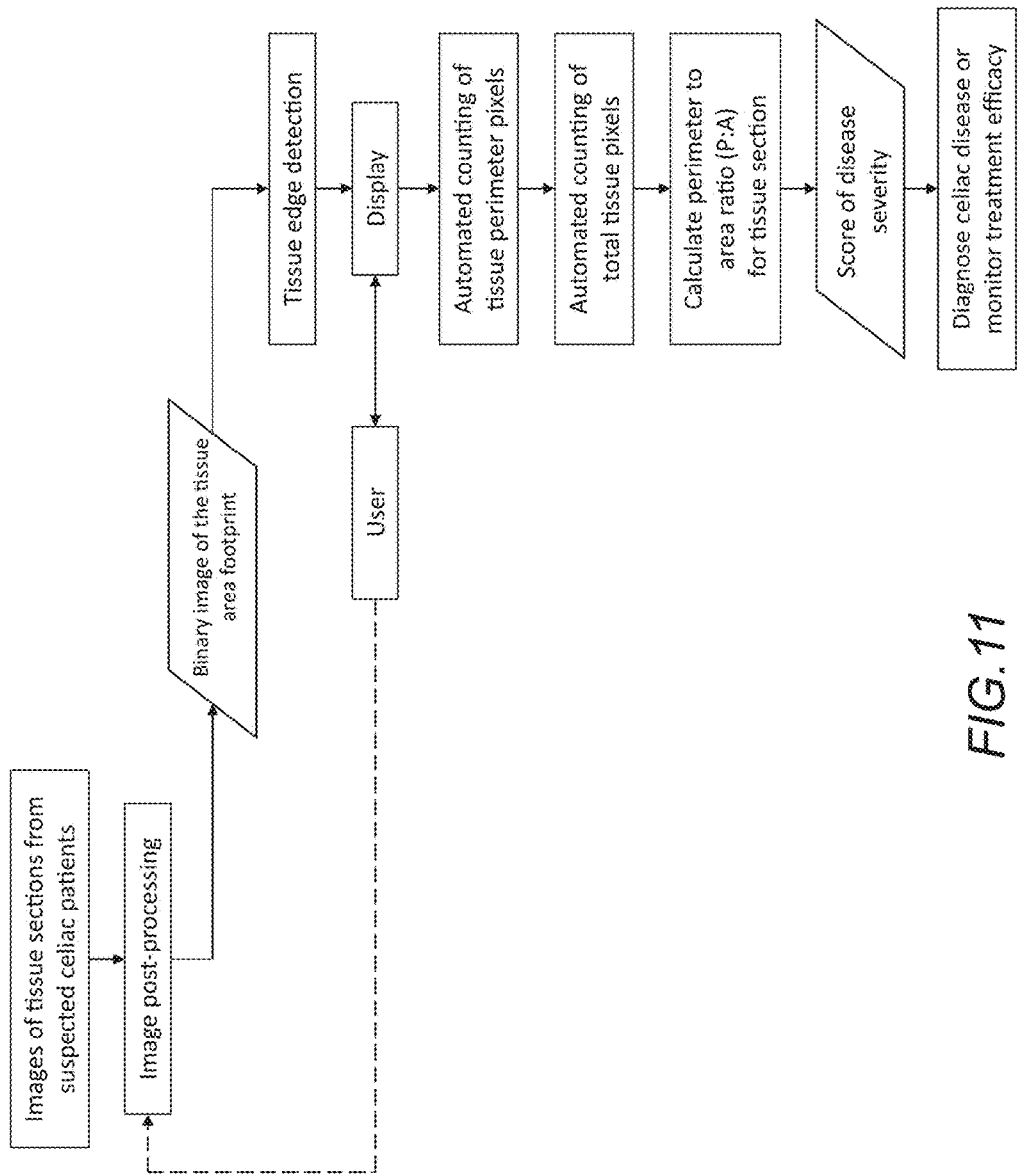
FIG. 11 illustrates the method by which digital image analysis of gross tissue morphometry is used to calculate the ratio of the perimeter to area; a value used to diagnose celiac disease and to score disease severity for those individuals classified as having celiac disease.

Digital Image Analysis Assessment of Celiac Disease Using Scores of Gross Tissue Morphometry In an illustrative embodiment, the method of digital image analysis assessment of tissue from patients suspected to have celiac disease comprises 9 consecutive steps, consisting of: 1) obtaining images of stained tissue sections from individuals submitted for celiac disease evaluation, 2) applying image post-processing steps to generate a binary mask of the tissue section area, 3) identifying the edge of the tissue area covered by the binary mask, 4) displaying said binary mask and detected edge, 5) counting the number of tissue area edge pixels, 6) counting the total tissue area pixels, 7) calculating the perimeter to area ratio (P:A) for the tissue section, 8) using said P:A value to score the severity of celiac disease for each patient under evaluation, and 9) use the score of celiac disease severity to diagnose celiac disease and make inferences about disease severity in each individual. FIG. 11 summarizes this process for assessing digital images of tissue sections obtained from individuals submitted for celiac disease evaluation.

The digital image analysis-based method described herein assesses a plurality of morphometric features characterizing the tissue area footprint on the glass slide. In an illustrative example, the method described herein is specifically implemented to calculate a surrogate measure of villus height and presentation; the ratio of perimeter to area. Therefore, each tissue section for evaluation needs to be stained with one or more histologic stains (i.e. hematoxylin and eosin, H&E) that highlight the gross size and shape of the tissue prior to digitalization with a digital slide scanner or microscope coupled with a camera.

Once the tissue section has been stained and processed using accepted histologic practices, the tissue section is scanned using a digital slide scanner or a microscope coupled with a camera to produce a digital image of the tissue section. The digital images of the tissue section(s) are made available for assessment by the digital image analysis algorithm process implemented by a computer.

The algorithm process performs a plurality of steps to process the image of each tissue section and to extract the morphometric features of gross tissue architecture. Each image is first converted from a color image of the tissue section to a grey scale image. Once converted, the algorithm process implements one or more image post-processing steps (i.e. image blurring, image sharpening, pixel intensity thresholding, etc.) to arrive at a binary mask of the area footprint of the tissue section. The binary mask of the tissue is displayed using a graphical user interface, and the mask is reviewed.

The algorithm process is then implemented to detect the edge of the tissue section. Once detected, the algorithm process generates an outline of the tissue area footprint and displays this for the user to review. Optionally, the user may integrate feedback into the algorithm process and reapply the post-processing steps and edge detection in an effort to refine and improve the characterization gross tissue morphometry.

The number of tissue edge pixels and total tissue area pixels are counted by the algorithm process and stored in computer memory, or in a database, for future recall and analysis.

Figure 12:
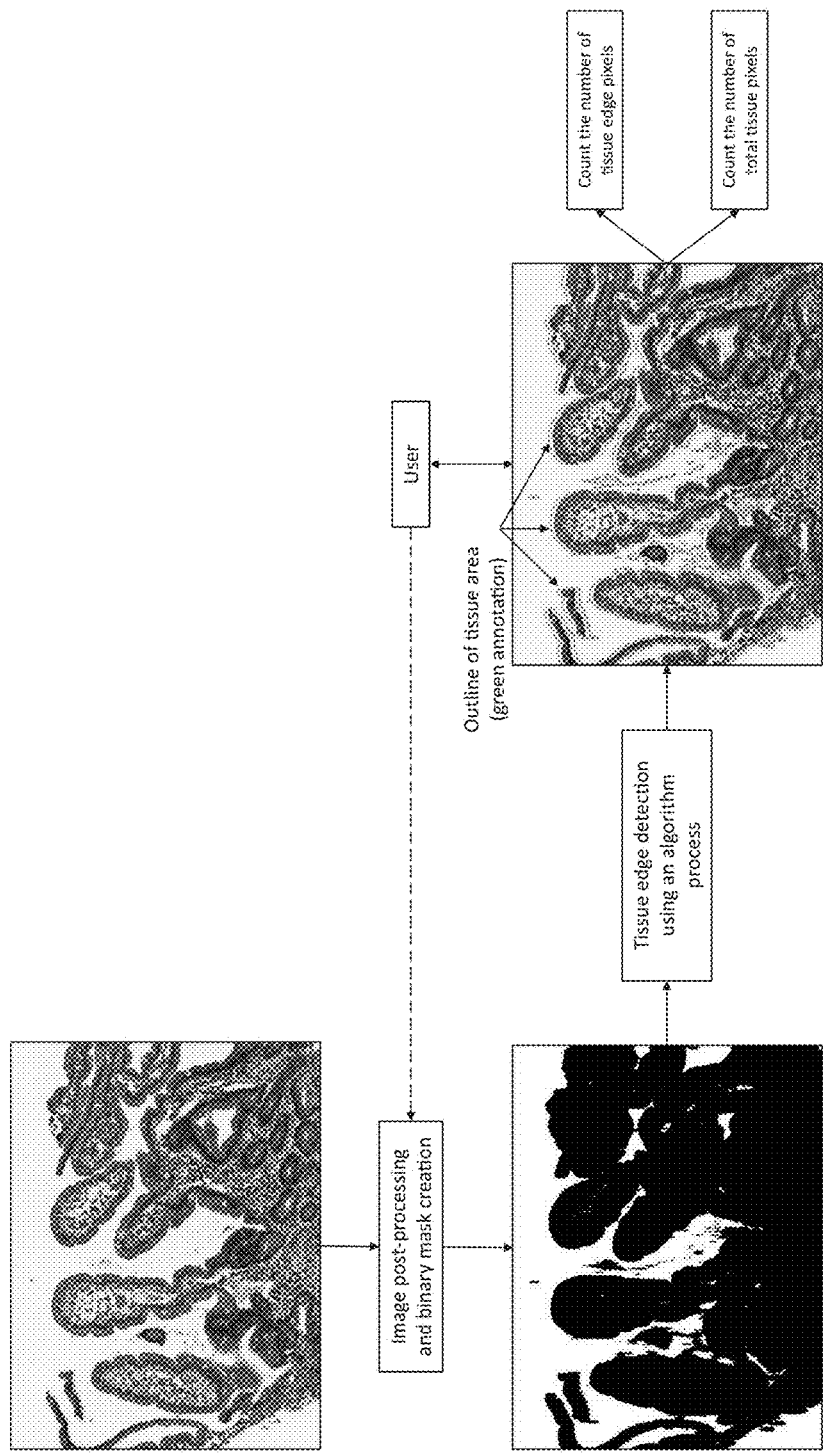
FIG. 12 demonstrates the method by which post-processing steps are applied to an original image to produce a binary mask of the tissue area footprint. Further, image analysis processes are applied to the binary mask to identify the boundaries of the tissue and to count the number of tissue perimeter pixels and total tissue pixel counts.

FIG. 12 provides an illustrative example of processing an image of a region of an H&E stained tissue section with the algorithm process. Image post-processing steps are applied to a grey scale converted image of the tissue section by an algorithm process, which produces a binary mask of the tissue area (black). The algorithm process then detects the edge of the tissue area, and generates and outline of the tissue section. The outline of the tissue section is then displayed (green) on the original image of the tissue section.

A user evaluates the binary mask and outline of the tissue, and feedback can optionally be integrated into the algorithm process to refine and improve the identification of the tissue area footprint and edge detection. In an illustrative embodiment, the algorithm process counts the number of tissue edge pixels and the total number of tissue area pixels based on the binary mask of the tissue area footprint.

Figure 13:
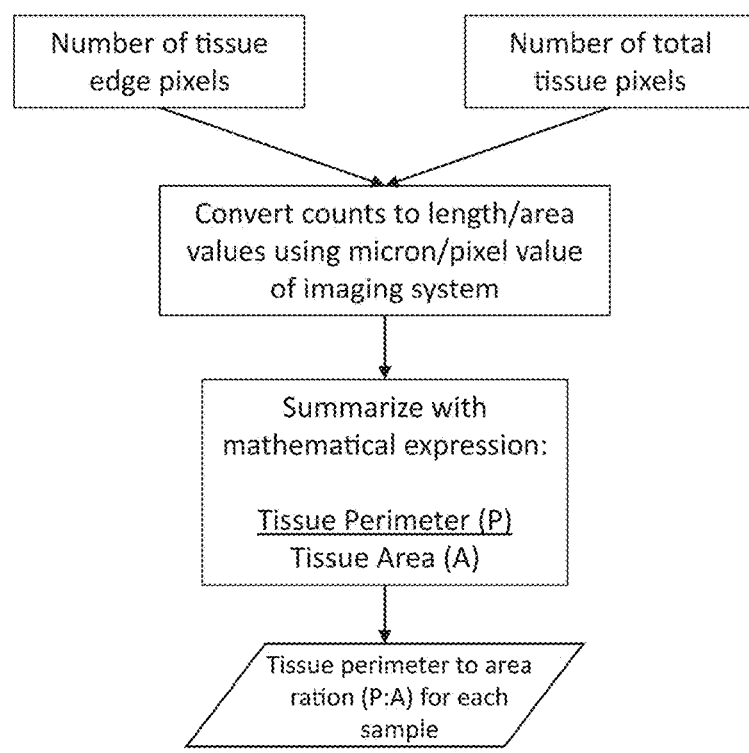
FIG. 13 shows the method by which the pixel counts for tissue perimeter and area are converted to length and area measurements, respectively, using the image system micron/pixel values, and the use of the tissue perimeter and area measurements to calculate the ratio of perimeter to area.

In an illustrative embodiment, as shown in FIG. 13, the total number of tissue pixels and number of edge pixels counted by the algorithm process are converted to area and length measurements, respectively, using the micron/pixel value of the imaging system used to generate the image of the tissue section. The ratio of the perimeter to area (P:A) for each tissue section is then determined. FIG. 13 summarizes this process for deriving the perimeter to area ratio for each tissue section based on the total counts of tissue area edge pixels and total tissue area pixels.

In instances where pixels are isotropic in dimensions and the micro/pixel values are held constant by the imaging system, the ratio of perimeter to area value can optionally be determined using the tissue edge length and tissue area pixel values.

A summary score (i.e. P:A value, linear transformation of P:A value, non-linear transformation of the P:A value, etc.) for the perimeter to area ratio is used to assess celiac disease severity for each patient sample under evaluation. A stratification scheme is applied to the disease severity scores. The stratification scheme entails applying selection criteria (i.e. thresholds, logical operators, etc.) to the disease severity score based on the P:A value.

The stratification scheme bins individuals submitted for evaluation into two diagnostic bins for celiac disease (i.e. positive diagnosis of celiac disease and negative diagnosis of celiac disease bins) and further sub-classifies (i.e. Marsh score of 1, 3A, 3B, 3C) the positive diagnosis bin into two or more sub-bins corresponding to disease severity.

In another embodiment of this invention, the digital image analysis-based method can extract additional morphometric features of the tissue area footprint (i.e. eccentricity, edge smoothness, lacunarity, etc.). One of more of these additional morphometric features can be used instead of, or in combination with, the P:A value to assess celiac disease severity.

Figure 14:
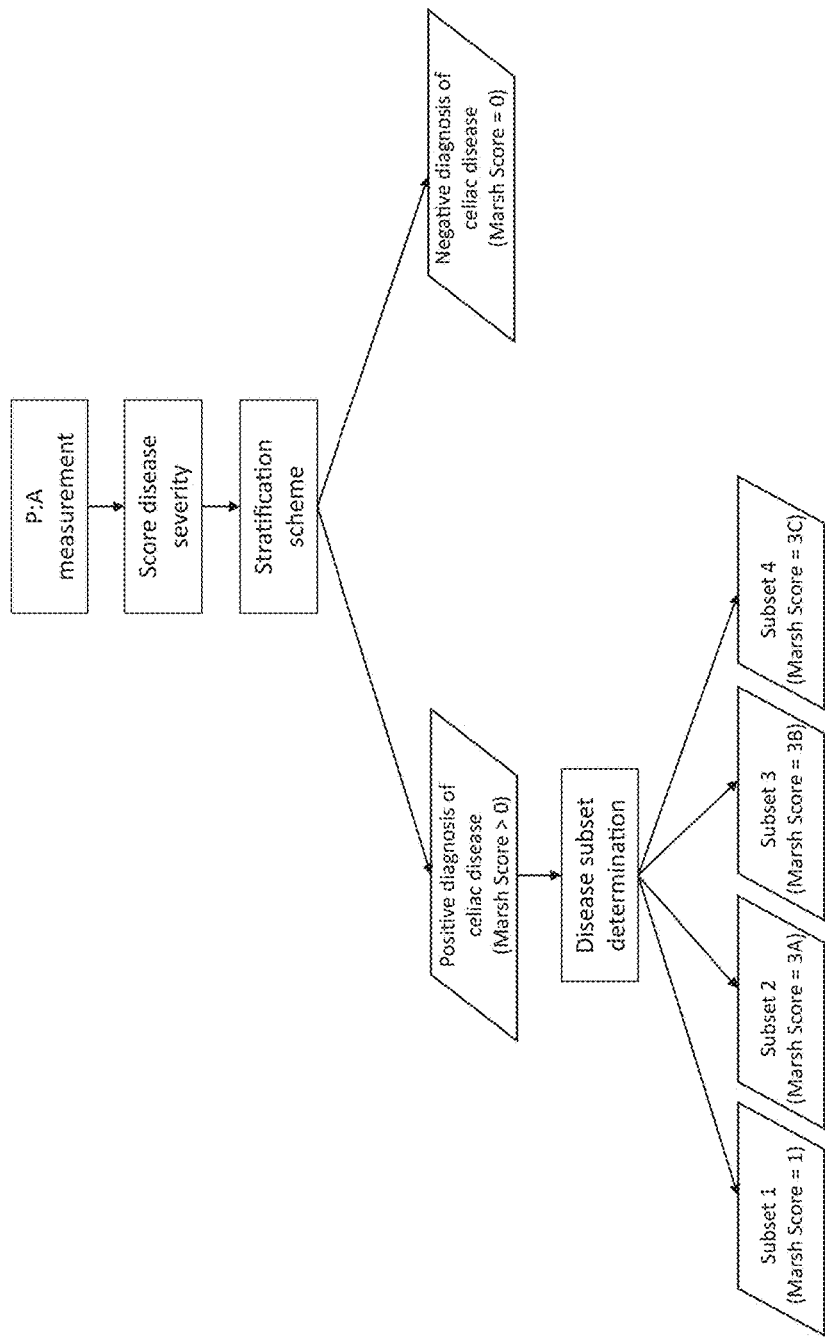
FIG. 14 demonstrates the method by which the P:A measurement is used to score disease severity resulting in a positive or negative diagnosis of celiac disease, and sub-classification of those individuals with a positive diagnosis of celiac disease based on disease severity.

In an illustrative embodiment, FIG. 14 demonstrates the process by which patients are stratified using the P:A value calculated by the digital image analysis of gross tissue morphometry method. The stratification scheme, in this example, was devised to predict the 'gold standard' Marsh score for diagnosing celiac disease and sub-classifying celiac disease patients based on the severity of the disease.

Figure 15:
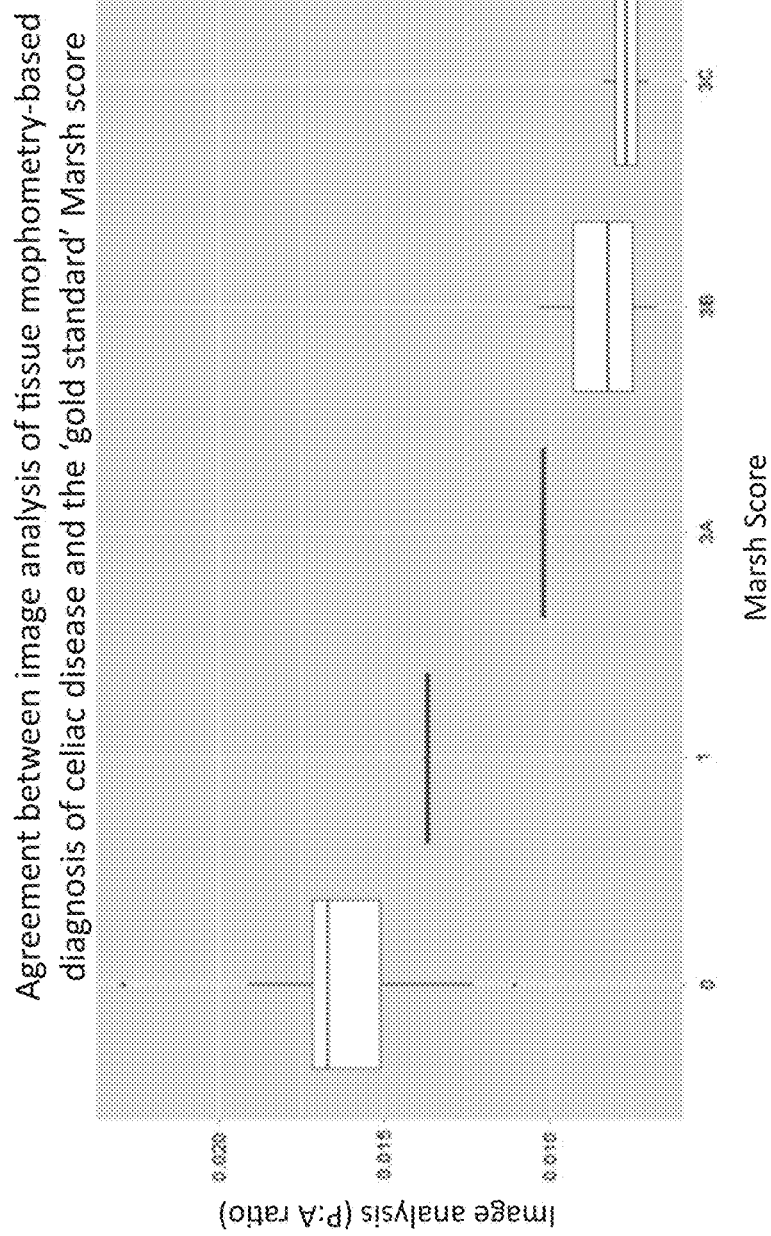
FIG. 15 shows the agreement between the digital image analysis method described herein and the 'gold standard' Marsh Score, and highlights the ability of digital image analysis of gross tissue morphometry to diagnose and sub-classify celiac disease.

FIG. 15 demonstrates the agreement between the digital image analysis algorithm process prediction of celiac disease and disease severity and the 'gold standard' Marsh Score for a sample cohort of suspected celiac disease patients submitted for evaluation.

In another embodiment of this invention, the digital image analysis of gross tissue morphometry method described herein can be used to assess the severity of celiac disease in celiac disease patients with the purpose of monitoring disease progression and treatment efficacy. In this embodiment, tissue sections from patients can be evaluated at various time points to monitor disease progression, or can be evaluated during one or more of: prior to, during, and after therapeutic intervention to evaluate therapeutic efficacy.

Thus, in accordance with an embodiment, a method for diagnosing Celiac disease using automated stereology assessments of tissue obtained from patients suspected to have Celiac disease includes: (i) obtaining one or more hematoxylin and eosin (H&E) stained tissue sections derived from gut tissue of one or more individuals for celiac disease evaluation; (ii) generating a digital image of the one or more tissue sections and saving said images to a database for future analysis; (iii) applying one or more post-processing steps to each image to generate a binary mask of the tissue area footprint of each tissue section; (iv) overlaying virtual stereology probes onto the one or more images of tissue sections; (v) determining the cut points where each probe transitions from tissue to non-tissue area or visa versa; (vi) determining the tissue hit value for the two terminus points of each probe; (vii) estimating the surface area to volume ratio by dividing the total number of cuts by the product of the probe length and the total number of hits; and (viii) using the estimation of the surface area to volume ratio for each tissue section to diagnose celiac disease and make inferences of celiac disease severity.

In accordance with another embodiment, a method for diagnosing celiac disease using digital image analysis of gross tissue morphometry from tissue sections obtained from patients submitted for evaluation of celiac disease includes: (i) obtaining one or more stained tissue sections derived from gut tissue of individuals suspected to have celiac disease; (ii) generating a digital image of the one or more tissue sections and saving said images to a database for future analysis; (iii) applying one or more post-processing steps to each image to generate a binary mask of the tissue area footprint of each tissue section; (iv) counting the pixels located on the perimeter of the tissue to calculate the perimeter of the tissue; (v) counting the total pixels encompassed by the boundaries of the tissue to calculate the total tissue area; (vi) converting the perimeter pixels to length and the tissue area pixels to area values using the microns/pixels of the imaging system used to digitize said tissue section; (vii) calculating the ratio of the perimeter to area for the tissue section; and (viii) using the ratio of perimeter to area to diagnose celiac disease and to make inferences of the severity of celiac disease.

What is claimed is:

1. An automated stereology-based method for assessing gross tissue architecture in individuals submitted for evaluation of celiac disease severity, comprising:
    obtaining digital images of stained tissue sections from said individuals mounted on glass histology slides;
    implementing an algorithm process using a computer to:
    apply image post-processing steps to said images to generate a binary image capturing the tissue area footprint on the glass slide;
    overlay virtual stereology probes;
    assess the cut and hit status for each probe intersecting the tissue area;
    display said assessment of each stereology probe on an image of the tissue section;
    quantify the number of cuts and hits; and
    calculate an estimate of the surface area to volume (SA:V) ratio;
    deriving a score of disease severity based on said SA:V ratio;
    using said score of disease severity to stratify patients into positive and negative diagnosis bins for celiac disease; and
    further stratifying those individuals with a positive diagnosis of celiac disease into sub-classifications of disease severity;
    wherein the image post-processing steps identify the boundaries of the tissue area and fill in the interior of the tissue area to produce a binary mask of the tissue area footprint.

2. The method of claim 1, wherein the virtual stereology probes are depicted as lines of a specified length and location relative to the coordinate system of the image being assessed.

3. The method of claim 1, wherein the virtual stereology probes are overlaid on the image being assessed in a geometric or random pattern.

4. The method of claim 1, wherein a cut is defined as the position along a probe wherein said probe transitions from being inside to outside the tissue area.

5. The method of claim 1, wherein a positive hit is defined as the terminus of a probe which is within the tissue area and a negative hit is defined as the terminus of a probe which is outside of the tissue area.

6. The method of claim 1, wherein positive hits and cuts are individually summed and the surface area to volume ratio is estimated by dividing the total number of cuts by the product of the probe length and the total number of positive hits.

7. The method of claim 1, wherein the score of disease severity is derived from the SA:V value and is one of: the SA:V value, a linear transformation of the SA:V value, or a non-linear transformation of the SA:V value.

8. The method of claim 1, wherein patients are stratified based on one or more of: linear, non-linear, threshold, and logical operators applied to the disease severity score.

9. The method of claim 1, wherein the stratification bins are used to diagnose celiac disease and infer disease severity.

10. The method of claim 1, wherein the assessment of celiac disease severity is used to monitor disease progression or therapeutic efficacy.

11. A digital image analysis-based method for assessing gross tissue morphometry in individuals submitted for evaluation of celiac disease severity, comprising:
    obtaining digital images of stained tissue sections mounted on glass slides obtained from individuals submitted for celiac disease evaluation;
    implementing and algorithm process using a computer to:
    apply image post-processing steps to generate a binary image of the tissue area footprint;
    detect the edge of the tissue area;
    display the detection of the tissue area edge;
    count the total number of tissue area edge pixels;
    count the total number of tissue area pixels;
    extract gross tissue morphometric features; and
    calculate the ratio of tissue area perimeter to total area (P:A);
    deriving a score of disease severity based on one or more of: the P:A ratio, one or more gross tissue morphometric features, and the P:A ratio and one or more gross tissue morphometric features;
    using said score of disease severity to stratify patients into positive and negative diagnosis bins for celiac disease; and
    further stratifying those individuals with a positive diagnosis of celiac disease into sub-classifications of disease severity;
    wherein the image post-processing steps identify the boundaries of the tissue area and fill in the interior of the tissue area to produce a binary mask of the tissue area footprint.

12. The method of claim 11, wherein the number of tissue area perimeter pixels and total area pixels are converted to length and area measurements, respectively, using the micron/pixel value of the imaging system used to generate said images.

13. The method of claim 11, wherein the morphometric features pertain to the physical presentation of the tissue area footprint on a glass slide.

14. The method of claim 11, wherein the score of disease severity is derived from the P:A value and is one of: the P:A value, a linear transformation of the P:A value, or a non-linear transformation of the P:A value.

15. The method of claim 11, wherein the score of disease severity is a summary score derived from one or more of: the P:A value and one or more gross tissue morphometric features.

16. The method of claim 11, wherein patients are stratified based on one or more of: linear, non-linear, threshold, or logical operators applied to the disease severity score.

17. The method of claim 11, wherein the stratification bins are used to diagnose celiac disease and infer disease severity.

18. The method of claim 11, wherein the assessment of celiac disease severity is used to monitor disease progression or therapeutic efficacy.

* * * * *